United States Patent
Gillett et al.

(10) Patent No.: US 11,312,480 B2
(45) Date of Patent: Apr. 26, 2022

(54) SYSTEM AND METHOD FOR CONTROLLING ROTORCRAFT

(71) Applicant: Textron Innovations Inc., Providence, RI (US)

(72) Inventors: Luke Dafydd Gillett, Grapevine, TX (US); Sung Kyun Kim, Bedford, TX (US); Robert Earl Worsham, II, Weatherford, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 719 days.

(21) Appl. No.: 16/416,508

(22) Filed: May 20, 2019

(65) Prior Publication Data
US 2020/0023941 A1 Jan. 23, 2020

Related U.S. Application Data

(63) Continuation-in-part of application No. 15/996,132, filed on Jun. 1, 2018, now Pat. No. 10,816,999.
(Continued)

(51) Int. Cl.
*B64C 13/50* (2006.01)
*B64C 13/04* (2006.01)
(Continued)

(52) U.S. Cl.
CPC ........ *B64C 13/503* (2013.01); *B64C 13/0421* (2018.01); *B64C 27/08* (2013.01);
(Continued)

(58) Field of Classification Search
CPC ... B64C 13/0421; B64C 27/82; B64C 13/503; B64D 35/04
See application file for complete search history.

(56) References Cited

U.S. PATENT DOCUMENTS

| | | |
|---|---|---|
| 2,934,267 A | 4/1960 | Wirkler et al. |
| 3,054,051 A | 9/1962 | Hayes |

(Continued)

FOREIGN PATENT DOCUMENTS

| | | |
|---|---|---|
| EP | 3379257 A1 | 9/2018 |
| GB | 800046 A | 8/1958 |

(Continued)

OTHER PUBLICATIONS

Kang, et al, "Improving Altitude Complementary Filter for Stable Helicopter Altitude Hold Modes during Search and Rescue Missions," Presented at the American Helicopter Society 64th Annual Forum, Montreal, Canada, Apr. 29-May 1, 2008, 8 pages.

*Primary Examiner* — Brian M O'Hara
(74) *Attorney, Agent, or Firm* — Slater Matsil, LLP

(57) ABSTRACT

In an embodiment, a rotorcraft includes: a flight control computer configured to: receive a first sensor signal from a first aircraft sensor of the rotorcraft; receive a second sensor signal from a second aircraft sensor of the rotorcraft, the second aircraft sensor being different from the first aircraft sensor; combine the first sensor signal and the second sensor signal with a complementary filter to determine an estimated vertical speed of the rotorcraft; adjust flight control devices of the rotorcraft according to the estimated vertical speed of
(Continued)

the rotorcraft, thereby changing flight characteristics of the rotorcraft; and reset the complementary filter in response to detecting the rotorcraft is grounded.

16 Claims, 9 Drawing Sheets

Related U.S. Application Data

(60) Provisional application No. 62/787,602, filed on Jan. 2, 2019.

(51) Int. Cl.
  *B64C 27/605* (2006.01)
  *B64C 27/78* (2006.01)
  *B64C 27/82* (2006.01)
  *B64C 27/08* (2006.01)
  *B64D 35/04* (2006.01)
  B64C 27/72 (2006.01)
  B64C 39/02 (2006.01)

(52) U.S. Cl.
  CPC ............ *B64C 27/605* (2013.01); *B64C 27/78* (2013.01); *B64C 27/82* (2013.01); *B64D 35/04* (2013.01); *B64C 39/024* (2013.01); *B64C 2027/7255* (2013.01); *B64C 2027/8263* (2013.01); *B64C 2201/024* (2013.01)

(56) References Cited

U.S. PATENT DOCUMENTS

| | | |
|---|---|---|
| 3,188,861 A | 6/1965 | Miller |
| 3,296,422 A | 1/1967 | Rusler, Jr. |
| 3,686,626 A | 8/1972 | Bateman et al. |
| 3,724,786 A | 4/1973 | Adams et al. |
| 5,265,825 A | 11/1993 | Ebert et al. |
| 5,349,347 A | 9/1994 | Muller |
| 6,492,934 B1 | 12/2002 | Hwang et al. |
| 7,248,964 B2 | 7/2007 | Bye |
| 8,271,151 B2 | 9/2012 | Hasan et al. |
| 9,108,745 B2 | 8/2015 | D'Arbonneau |
| 9,304,516 B2 | 4/2016 | Christensen et al. |
| 9,354,635 B2 | 5/2016 | Shue |
| 2009/0299554 A1 | 12/2009 | Freissinet |
| 2016/0325830 A1* | 11/2016 | Waltner .................. B64C 27/57 |
| 2019/0094887 A1 | 3/2019 | Di et al. |
| 2020/0150690 A1* | 5/2020 | Galffy .................... B64C 13/18 |

FOREIGN PATENT DOCUMENTS

| | | |
|---|---|---|
| GB | 803722 A | 10/1958 |
| GB | 1101219 A | 1/1968 |
| GB | 2136576 A | 9/1984 |
| WO | 0070354 A1 | 11/2000 |
| WO | 2016037035 A1 | 3/2016 |

* cited by examiner

SYSTEM AND METHOD FOR CONTROLLING ROTORCRAFT

PRIORITY CLAIM AND CROSS-REFERENCE

This application is a continuation-in-part of U.S. patent application Ser. No. 15/996,132, filed on Jun. 1, 2018, entitled "System and Method for Controlling Rotorcraft," which is incorporated herein by reference in its entirety.

This application also claims the benefit of and priority to U.S. Provisional Patent Application Ser. No. 62/787,602, filed on Jan. 2, 2019, entitled "System and Method for Controlling a Rotorcraft," which is incorporated herein by reference in its entirety.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

In an embodiment, a method includes: receiving a first sensor signal from a first aircraft sensor of a rotorcraft, the first sensor signal including raw airspeed values of the rotorcraft; receiving a second sensor signal from a second aircraft sensor of the rotorcraft, the second aircraft sensor being different from the first aircraft sensor; measuring a first speed of the rotorcraft, the first speed being groundspeed of the rotorcraft or raw airspeed of the rotorcraft; determining airspeed values of the rotorcraft, the determining including: using the raw airspeed values in the first sensor signal as the determined airspeed values in response to the first speed of the rotorcraft being less than or equal to a predetermined value; and estimating the determined airspeed values in response to the first speed of the rotorcraft being greater than the predetermined value, the estimating including: combining the first sensor signal and the second sensor signal with a complementary filter to determine estimated airspeed values; and using the estimated airspeed values as the determined airspeed values; and adjusting flight control devices of the rotorcraft according to the determined airspeed values.

In some embodiments of the method, combining the first sensor signal and the second sensor signal includes: integrating the second sensor signal with respect to time to obtain a first filtered signal; and adding the first filtered signal and the first sensor signal to obtain a second filtered signal, the second filtered signal including the estimated airspeed values of the rotorcraft. In some embodiments of the method, the first aircraft sensor is a pitot tube. In some embodiments of the method, the second aircraft sensor is an accelerometer. In some embodiments of the method, the predetermined value is a first threshold when the rotorcraft is accelerating, and the predetermined value is a second threshold when the rotorcraft is decelerating, the second threshold being less than the first threshold. In some embodiments of the method, the first threshold is 40 knots, and the second threshold is 25 knots.

In an embodiment, a rotorcraft includes: a pitot tube; an accelerometer; a plurality of flight control devices; and a flight control computer coupled to the pitot tube, the accelerometer, and the flight control devices, the flight control computer being configured to: receive raw airspeed values of the rotorcraft from the pitot tube; receive raw forward acceleration values of the rotorcraft from the accelerometer; measure a first speed of the rotorcraft, the first speed being groundspeed of the rotorcraft or raw airspeed of the rotorcraft; determine airspeed values of the rotorcraft by: using the raw airspeed values as the determined airspeed values in response to the first speed of the rotorcraft being less than or equal to a predetermined value; and estimating the determined airspeed values by combining the raw airspeed values and the raw forward acceleration values in response to the first speed of the rotorcraft being greater than the predetermined value; and adjusting flight control devices of the rotorcraft according to the determined airspeed values.

In some embodiments of the rotorcraft, the flight control computer is configured to estimate the determined airspeed values by: combining the raw airspeed values and the raw forward acceleration values with a complementary filter to determine estimated airspeed values; and using the estimated airspeed values as the determined airspeed values. In some embodiments of the rotorcraft, the flight control computer is configured to combine the raw airspeed values and the raw forward acceleration values by: integrating the raw forward acceleration values with respect to time to obtain integrated forward acceleration values; and adding the integrated forward acceleration values and the raw airspeed values to obtain the estimated airspeed values. In some embodiments of the rotorcraft, the predetermined value is a first threshold when the first speed of the rotorcraft is less than or equal to the predetermined value, and the predetermined value is a second threshold when the first speed of the rotorcraft is greater than the predetermined value, the second threshold being less than the first threshold.

In an embodiment, a method includes: receiving a first sensor signal from a first aircraft sensor of a rotorcraft; receiving a second sensor signal from a second aircraft sensor of the rotorcraft, the second aircraft sensor being different from the first aircraft sensor; combining the first sensor signal and the second sensor signal with a complementary filter to determine an estimated speed of the rotorcraft; adjusting flight control devices of the rotorcraft according to the estimated speed of the rotorcraft; measuring a first speed of the rotorcraft, the first speed being groundspeed of the rotorcraft or raw airspeed of the rotorcraft; and resetting the complementary filter in response to the first speed of the rotorcraft being less than a predetermined threshold.

In some embodiments of the method, the estimated speed of the rotorcraft is an estimate of vertical speed of the rotorcraft. In some embodiments of the method, the estimated speed of the rotorcraft is an estimate of airspeed of the rotorcraft. In some embodiments of the method, the combining the first sensor signal and the second sensor signal with the complementary filter includes: filtering the first sensor signal with a first filter to obtain a first filtered signal; filtering the second sensor signal with a second filter to obtain a second filtered signal, the second filter and the first filter complementing one another; and adding the first filtered signal and the second filtered signal to determine the estimated speed of the rotorcraft. In some embodiments of the method, the combining the first sensor signal and the second sensor signal with the complementary filter includes: subtracting the first sensor signal from the second sensor signal to obtain a noise difference signal; filtering the noise difference signal to obtain a filtered difference signal; and adding the first sensor signal and the filtered difference signal to determine the estimated speed of the rotorcraft. In some embodiments of the method, the first aircraft sensor is an accelerometer. In some embodiments of the method, the receiving the first sensor signal includes: receiving an acceleration signal from the accelerometer; and integrating the acceleration signal to obtain the first sensor signal. In some embodiments of the method, the second aircraft sensor is a pitot tube. In some embodiments of the method, the receiving the second sensor signal includes: receiving a velocity signal from the pitot tube; and using the velocity signal as the second sensor signal. In some embodiments of the method, the adjusting the flight control devices of the rotorcraft includes: decoupling pilot flight controls of the rotorcraft from the flight control devices according to the estimated speed. In some embodiments of the method, the first speed is the groundspeed of the rotorcraft. In some embodiments of the method, the first speed is the raw airspeed of the rotorcraft.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
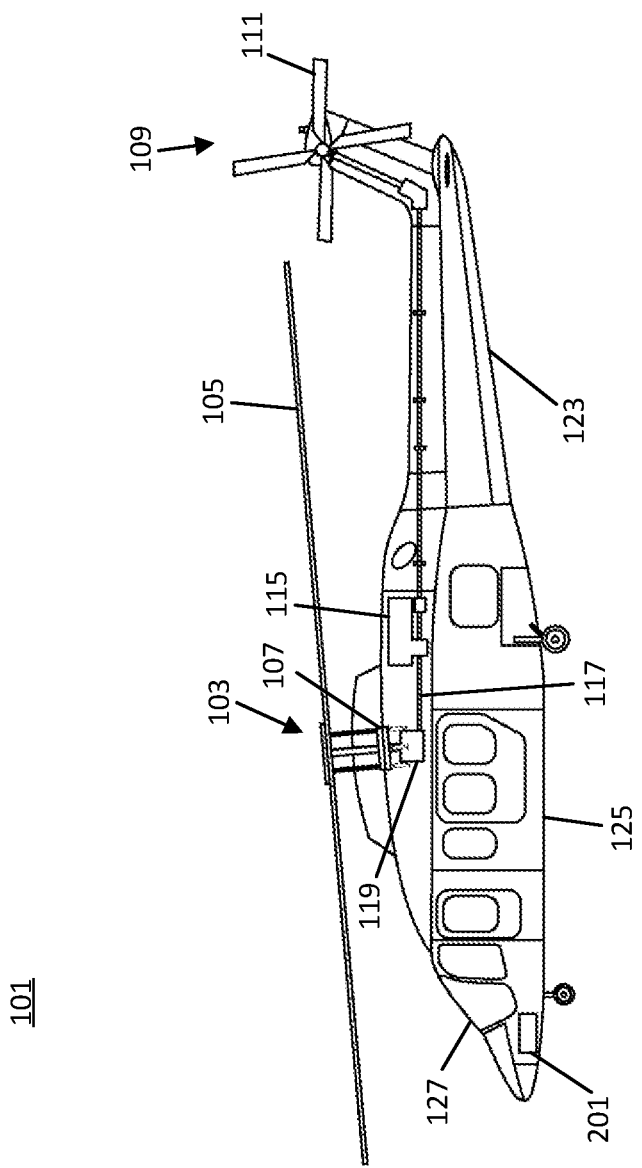
FIG. 1 illustrates a rotorcraft, according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW system controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW system controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

FIG. 1 illustrates a rotorcraft 101, according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the main rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2A:
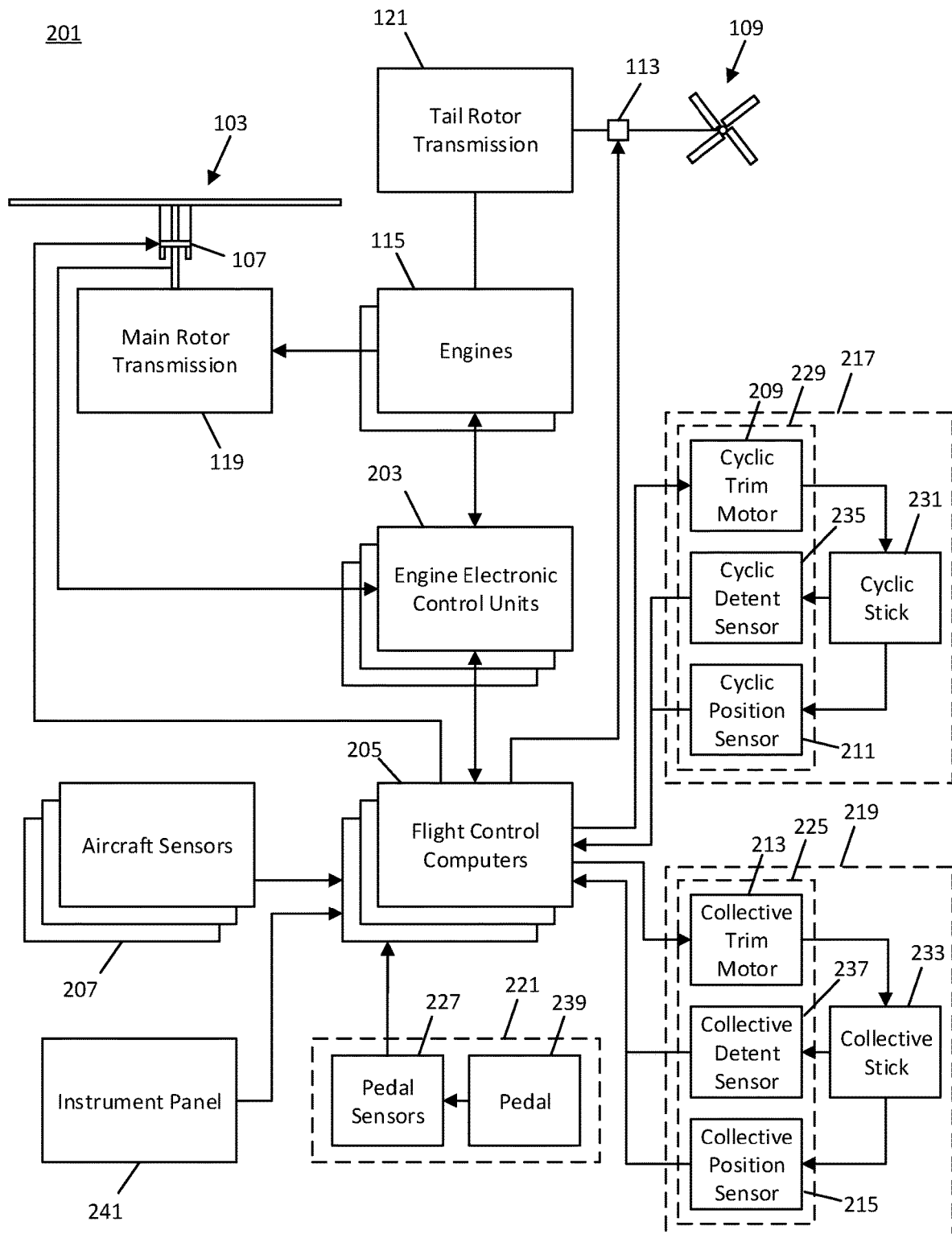
FIG. 2A is a block diagram of a fly-by-wire flight control system, according to some embodiments.
Figure 2B:
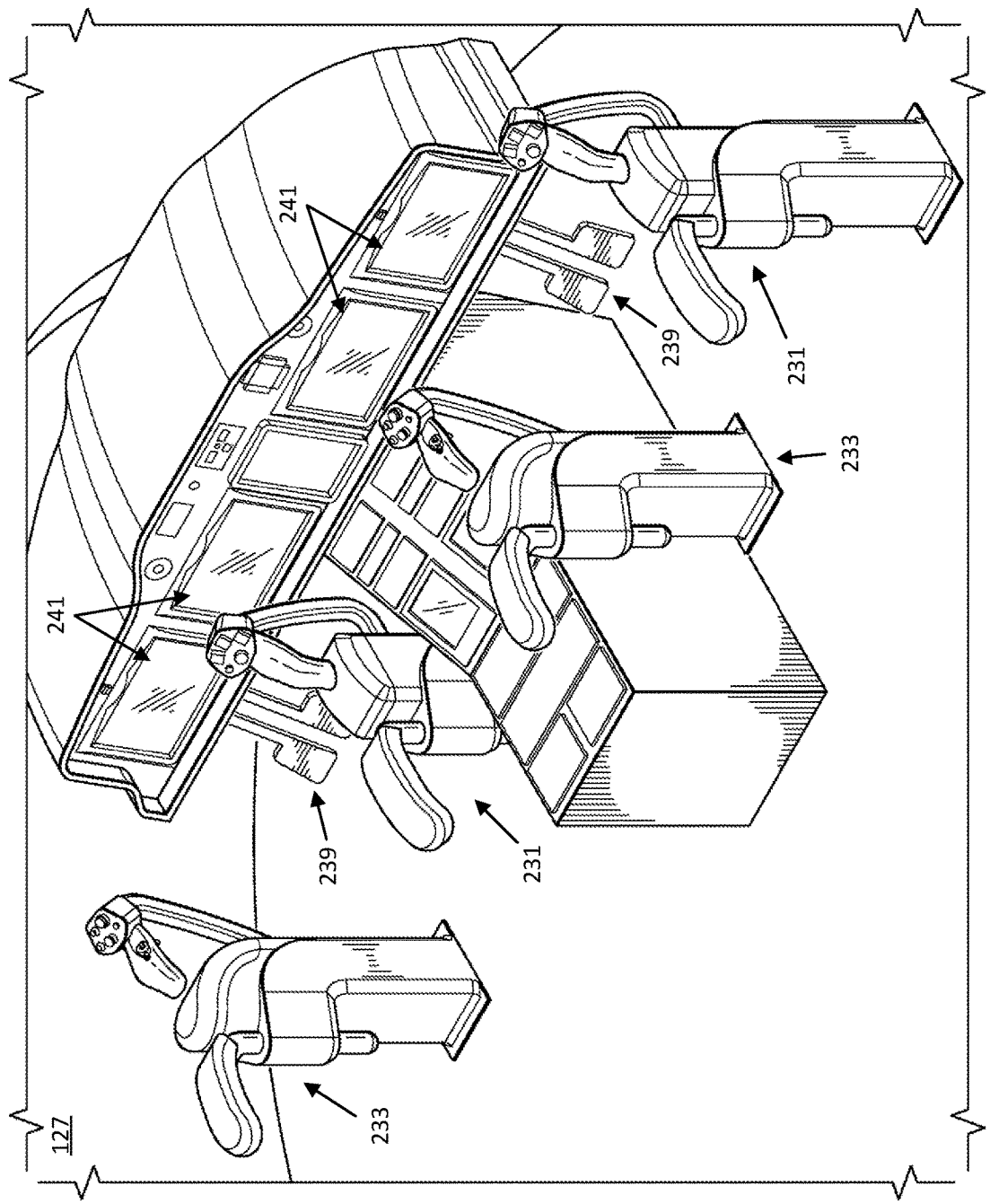
FIG. 2B illustrates the inside of a cockpit, according to some embodiments.

FIG. 2A is a block diagram of a fly-by-wire flight control system 201 for the rotorcraft 101, according to some embodiments. FIG. 2B illustrates the inside of the cockpit 127, according to some embodiments, and is described in conjunction with FIG. 2A. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft 101. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other aircraft sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic trim motors 209 and collective trim motors 213 may drive the cyclic stick 231 and collective stick 233, respectively, to suggested positions. The cyclic trim motors 209 and collective trim motors 213 may drive the cyclic stick 231 and collective stick 233, respectively, to suggested positions, but this movement capability may also be used to provide tactile cueing to a pilot. The cyclic trim motors 209 and collective trim motors 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the cyclic trim motors 209 and collective trim motors 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. The cyclic detent sensor 235 and collective detent sensor 237 detect motion and/or position of the respective control stick that is caused by pilot input, as opposed to motion and/or position caused by commands from the FCCs 205, rotorcraft vibration, and the like and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
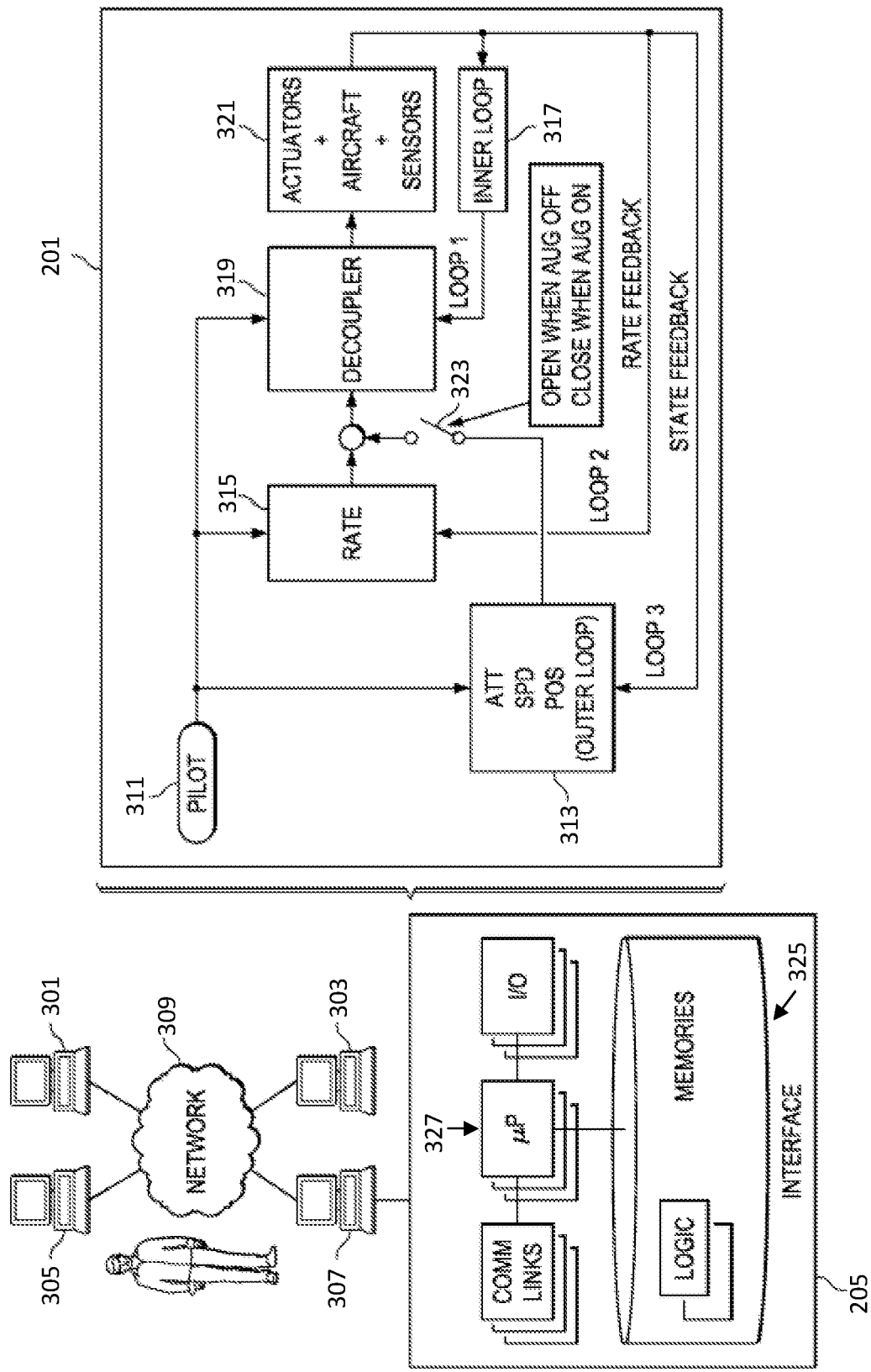
FIG. 3 is a block diagram of a three-loop flight control system, according to some embodiments.

FIG. 3 is a block diagram of the flight control system 201, according to some embodiments. Some operational aspects of the flight control system 201 are shown in a highly schematic fashion. In particular, the flight control system 201 is schematically shown as being implemented as a series of inter-related feedback loops running certain control laws. Although the flight control system 201 is illustrated as being a three-loop flight control system, it should be appreciated that the flight control system 201 could be implemented in a different manner, such as with a different quantity of control loops.

In some embodiments, elements of the flight control system 201 may be implemented at least partially by the FCCs 205. However, all, some, or none of the components (301, 303, 305, 307) of flight control system 201 could be located external or remote from the rotorcraft 101 and communicate to on-board devices through a network connection 309.

The flight control system 201 has a pilot input 311, an outer loop 313, a middle loop 315, an inner loop 317, a decoupler 319, and aircraft equipment 321 (corresponding, e.g., to flight control devices such as swashplate 107, tail rotor transmission 121, etc.; to actuators (not shown) driving the flight control devices; to sensors such as aircraft sensors 207, cyclic position sensors 211, collective position sensors 215, cyclic detent sensors 235, collective detent sensors 237, etc.; and the like).

In the example shown, a three-loop design separates the inner stabilization and rate feedback loops from outer guidance and tracking loops. The control law structure primarily assigns the overall stabilization task and related tasks of reducing pilot workload to inner loop 317. Next, the middle loop 315 (sometimes called the rate loop) provides rate augmentation. Outer loop 313 focuses on guidance and tracking tasks. Since inner loop 317 and middle loop 315 provide most of the stabilization, less control effort is required at the outer loop level. As representatively illustrated, a switch 323 may be provided to turn outer loop flight augmentation on and off, the tasks of outer loop 313 are not necessary for flight stabilization.

In some embodiments, the inner loop 317 and middle loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. According to some embodiments, the control laws running in the illustrated the loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

The flight control system 201 may be realized as programming executed by the FCCs 205. The programming includes instructions implementing aspects of the flight control system 201. The FCCs 205 may include memories 325, such as non-transitory computer readable storage mediums, that store the programming. One or more processors 327 are connected to the memories 325, and are operable to execute the programming.

The flight control system 201 relies on accurately determining the position, velocity (or speed), and acceleration of the rotorcraft 101 when controlling flight. In particular, all three loops of the flight control system 201 use the vertical speed ($V_{V\_SPD}$) of the rotorcraft 101. The use of inaccurate $V_{V\_SPD}$ values may degrade the performance of the control laws implemented by the flight control system 201, and may result in partial or total failure of the rotorcraft 101. According to some embodiments, $V_{V\_SPD}$ is estimated by performing complementary filtering with multiple signals containing values for $V_{V\_SPD}$. Estimating the $V_{V\_SPD}$ of the rotorcraft 101 by complementary filtering with multiple signals may improve the accuracy of $V_{V\_SPD}$ values used by the flight control system 201.

Figure 4:
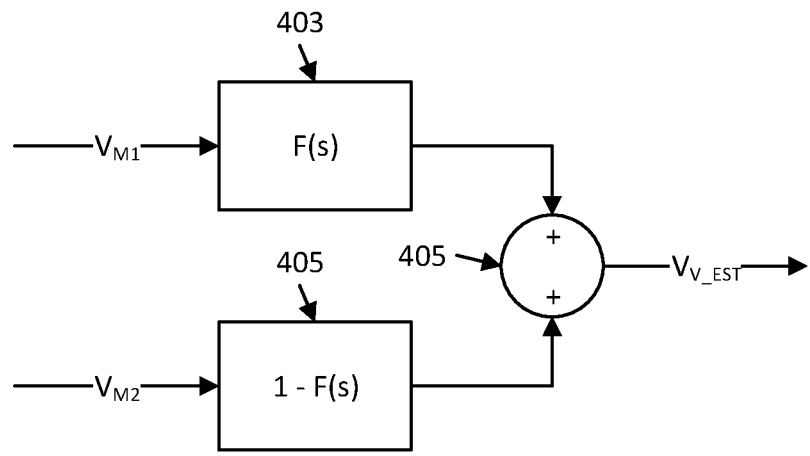
FIG. 4 is a block diagram of a first system for vertical speed estimation, according to some embodiments.

FIG. 4 is a block diagram of a first system 401 for $V_{V\_SPD}$ estimation, according to some embodiments. The first system 401 has two inputs: a first measured vertical speed ($V_{M1}$) signal and a second measured vertical speed ($V_{M2}$) signal. The signals may be received from a variety of different sources, and as will be discussed below, may be indirectly determined by measuring other properties of the rotorcraft 101. The signals are noisy signals containing values for $V_{V\_SPD}$. The noise in $V_{M1}$ and $V_{M2}$ may be located in different regions. In particular, $V_{M1}$ includes accurate $V_{V\_SPD}$ values in the short-term but is noisy in the long-term (e.g., has low-frequency noise). Conversely, $V_{M2}$ includes accurate $V_{V\_SPD}$ values in the long-term but is noisy in the short-term (e.g., has high-frequency noise). The first system 401 includes a high-pass filter 403, a low-pass filter 405, and a summer 405, each of which may be implemented as analog circuits or through digital signal processing in the FCCs 205, such as with a digital signal processor (DSP).

The high-pass filter 403 is used to filter low-frequency noise from $V_{M1}$, and the low-pass filter 405 is used to filter high-frequency noise from $V_{M2}$. Notably, the high-pass filter 403 and low-pass filter 405 are complementary filters. For example, if the transfer function of the high-pass filter 403 is F(s), then the transfer function of the low-pass filter 405 is the complement of F(s), e.g., 1−F(s). In other words, the high-pass filter 403 and low-pass filter 405 sum to an all-pass filter having a value of 1. The summer 405 adds the filtered signals from the high-pass filter 403 and low-pass filter 405, thereby producing an estimated vertical speed ($V_{V\_EST}$) signal. Although the $V_{V\_EST}$ signal contains an estimation of $V_{V\_SPD}$, it may contain more accurate $V_{V\_SPD}$ values than the noisy signals $V_{M1}$ and $V_{M2}$ contain individually.

Figure 5:
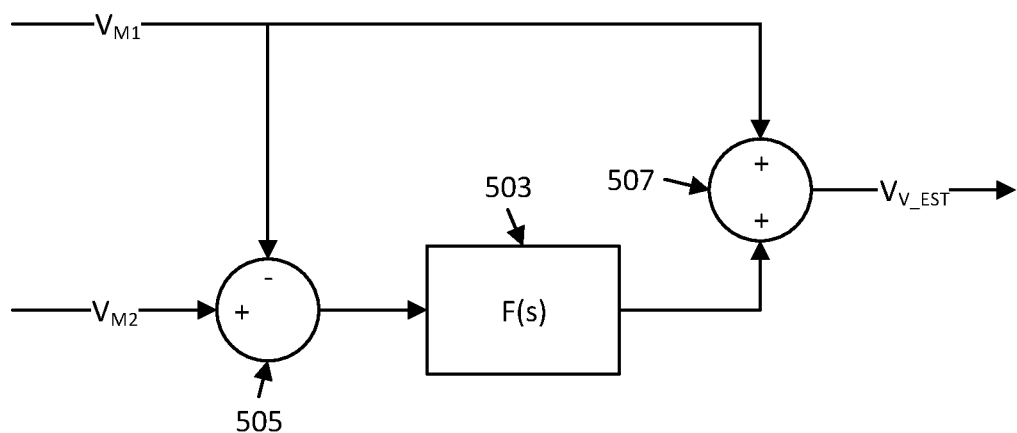
FIG. 5 is a block diagram of a second system for vertical speed estimation, according to some embodiments.

FIG. 5 is a block diagram of a second system 501 for $V_{V\_SPD}$ estimation, according to some embodiments. Like the first system 401, the second system 501 has two inputs ($V_{M1}$ and $V_{M2}$) and one output ($V_{V\_EST}$). The second system 501 is equivalent to the first system 401, except the second system 501 only has a single filter 503 that operates on noise in the $V_{M1}$ and $V_{M2}$ signals. A summer 505 determines the difference between the input $V_{M1}$ and $V_{M2}$ signals (e.g., subtracts $V_{M1}$ from $V_{M2}$), and the filter 503 operates on that difference. A summer 507 then sums the filtered difference with the original $V_{M1}$ signal, thereby producing $V_{V\_EST}$ as its output.

It should be appreciated that the first system 401 and second system 501 show some examples of complementary filters. Other configuration (such as that shown below in FIG. 7) may also be used to implement complementary filtering.

Figure 6:
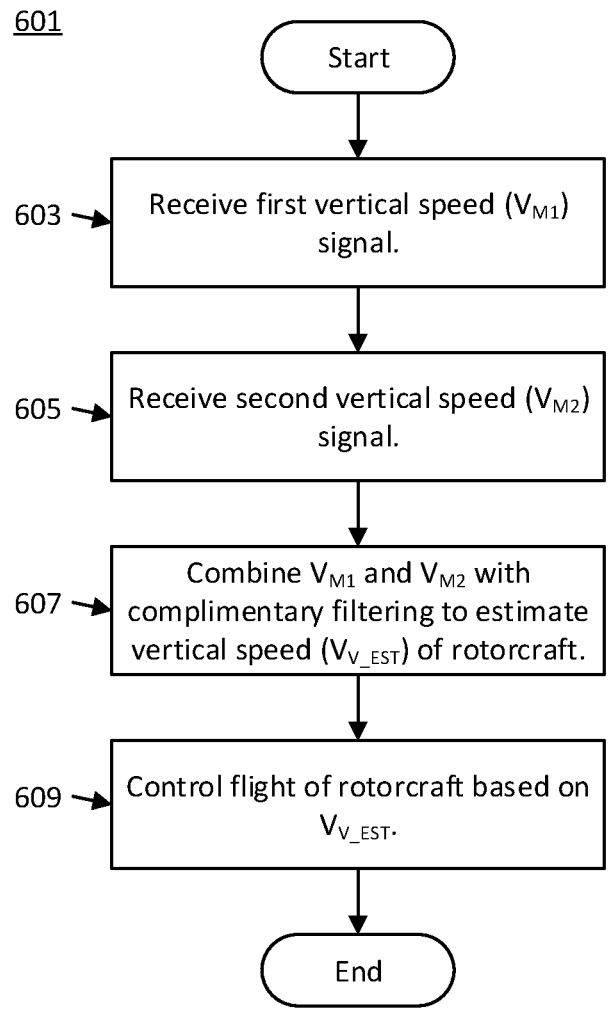
FIG. 6 is a block diagram of a method for vertical speed estimation, according to some embodiments.

FIG. 6 is a block diagram of a method 601 for vertical speed estimation, according to some embodiments. The method 601 may be implemented as part of the flight control system 201. In particular, the FCCs 205 may perform the method 601 when controlling flight of the rotorcraft 101.

In process 603, the $V_{M1}$ signal is received. It should be appreciated that the $V_{M1}$ signal may be received through a variety of means or sources. In some embodiments, the $V_{M1}$ signal is directly transduced. For example, the $V_{M1}$ signal may be a sensor signal from an aircraft sensor 207 that directly measures vertical speed and produces a raw vertical speed value, such as with a variometer or other vertical speed indicator (VSI). In other embodiments, another sensor signal is transduced and the $V_{M1}$ signal is derived from the transduced sensor signal. For example, the $V_{M1}$ signal may be indirectly received by measuring vertical inertial acceleration (e.g., a(t)) of the rotorcraft 101. Vertical inertial acceleration may be measured with a first one of the aircraft sensors 207, such as with an accelerometer. The $V_{M1}$ signal is then obtained by integrating the vertical inertial acceleration with respect to time, as shown in Equation 1. Determining $V_{V\_SPD}$ of the rotorcraft 101 by integrating the vertical inertial acceleration may be more accurate in the short-term than in the long-term.

$$V_{M1} = \int a(t)dt \qquad (1)$$

In process 605, the $V_{M2}$ signal is received. It should be appreciated that the $V_{M2}$ signal may be received through a variety of means or sources. In some embodiments, the $V_{M2}$ signal is directly transduced. For example, the $V_{M2}$ signal may be a sensor signal from an aircraft sensor 207 that directly measures vertical speed and produces a raw vertical speed value, such as with a variometer or other VSI. In other embodiments, another sensor signal is transduced and the $V_{M2}$ signal is derived from the transduced sensor signal. Different aircraft sensor 207 may be used to receive the $V_{M1}$ and $V_{M2}$ signals. For example, the $V_{M2}$ signal may be indirectly received by measuring vertical position (e.g., s(t)) of the rotorcraft 101. Vertical position may be measured with a second one of the aircraft sensors 207, such as with an air pressure sensor (e.g., a barometer), a GPS sensor, an ultrasonic or laser-based height measurement sensor, or the like. The $V_{M2}$ signal is then obtained by differentiating the vertical position with respect to time, as shown in Equation 2. Determining $V_{V\_SPD}$ of the rotorcraft 101 by differentiating the vertical position may be more accurate in the long-term than in the short-term.

$$V_{M2} = \frac{d}{dt}s(t) \qquad (2)$$

In process 607, the $V_{M1}$ and $V_{M2}$ signals are combined with complementary filtering to determine a $V_{V\_EST}$ signal, which indicates the $V_{V\_EST}$ of the rotorcraft 101. The complementary filtering may be performed with a system such as the first system 401, the second system 501, or the like. As noted above, such filtering could be performed in hardware or in software.

In process 609, flight of the rotorcraft 101 is controlled based on $V_{V\_EST}$ of the rotorcraft 101. The $V_{V\_EST}$ value may be a variable used by one or more loops of the flight control system 201, such as the outer loop 313, middle loop 315, and/or inner loop 317. The flight control devices of the rotorcraft 101 may be adjusted to change the flight characteristics of the rotorcraft 101. For example, the swashplate 107 may be actuated based on $V_{V\_EST}$ to maintain a particular speed or direction, to automate an approach to hover or landing, or the like. Likewise, the tail rotor actuator 113 may be adjusted based on $V_{V\_EST}$. In some embodiments, the value of $V_{V\_EST}$ may be used to influence other functionality of the flight control system 201. For example, the decoupler 319 may use $V_{V\_EST}$ when decoupling pilot flight controls, or the middle loop 315 may use $V_{V\_EST}$ when stabilizing the rotorcraft 101.

Figure 7:
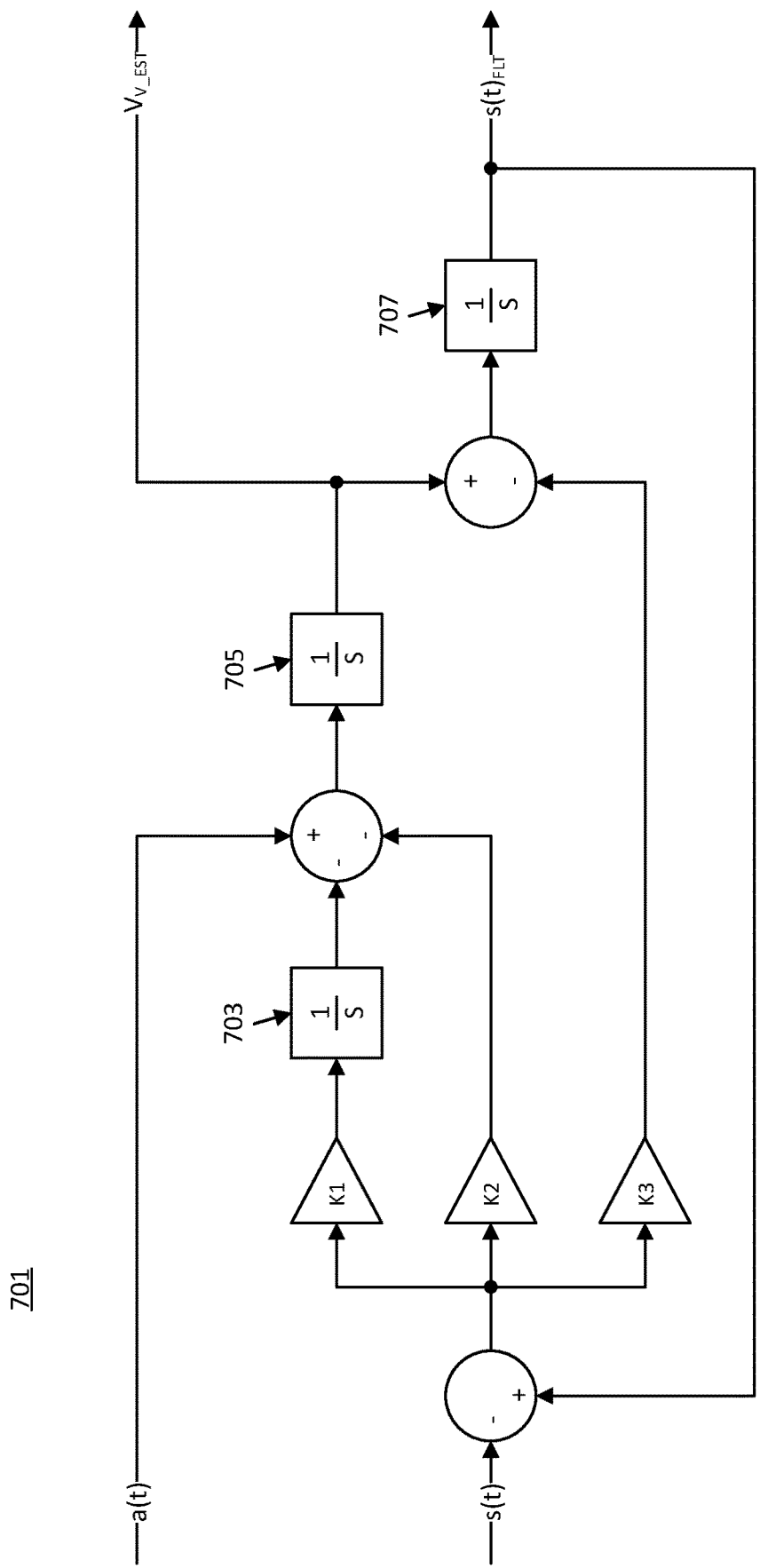
FIG. 7 is a block diagram of a filter, according to some embodiments.

FIG. 7 is a block diagram of a filter 701 that may be used to realize the first system 401 or second system 501, according to some embodiments. The filter 701 is a complimentary filter implemented with three integrators 703, 705, and 707. Further, the filter 701 is indicative of embodiments where the $V_{M1}$ and $V_{M2}$ signals are derived from transduced sensor signals. In particular, the $V_{M1}$ signal is derived from a signal from an altimeter (e.g., s(t)), and the $V_{M2}$ signal is derived from a signal from an accelerometer (e.g., a(t)). The filter 701 produces two output signals: $V_{V\_EST}$ and $s(t)_{EST}$. The $s(t)_{EST}$ signal is an estimate of the altimeter signal, which is also filtered by complimentary filtering.

Resetting the integrators 703, 705, and 707 may ensure the filter 701 accurately produces the $V_{V\_EST}$ signal. The integrators 703, 705, and 707 may be reset in a variety of ways, and may be reset to different values. According to some embodiments, the integrators 703, 705, and 707 may be reset when: (1) the FCCs 205 initially start up; (2) the FCCs 204 are reset; (3) the rotorcraft 101 is on the ground, as determined by weight-on-wheel sensors of the aircraft sensors 207; (4) an input signal of the filter 701 has failed; (5) any one of the integrators 703, 705, and 707 have reached their upper or lower bounds, which may be predefined values; and/or (6) the groundspeed or raw airspeed of the rotorcraft 101 is less than a predefined threshold.

In some embodiments, the filter 701 is reset in response to detecting the rotorcraft is grounded. Detecting the rotorcraft is grounded may include receiving a first weight signal from a weight-on-wheel sensor of the rotorcraft 101; determining, according to the first weight signal, a first wheel of the rotorcraft 101 is bearing more than a predetermined quantity of weight; and determining the rotorcraft 101 is grounded in response to the first wheel bearing more than the predetermined quantity of weight.

Upon a reset, the integrator 703 is reset to a value of zero, the integrator 705 is reset to the current vertical speed value as estimated by air data systems of the rotorcraft 101, and the integrator 707 is reset to the current altitude as estimated by air data systems of the rotorcraft 101. The air data systems of the rotorcraft 101 determine the vertical speed and altitude directly by transducing signals from air sensors of the aircraft sensors 207.

Although embodiments are described in the context of estimating the vertical speed ($V_{V\_SPD}$) of the rotorcraft 101, it should be appreciated that embodiment techniques may be used to estimate speeds along other directions. For example, the airspeed of the rotorcraft 101 may also be estimated by complimentary filtering with multiple noisy signals. All three loops of the flight control system 201 also use the airspeed of the rotorcraft 101. The use of inaccurate airspeed values may degrade the performance of the control laws implemented by the flight control system 201, and may result in partial or total failure of the rotorcraft 101. According to some embodiments, the airspeed of the rotorcraft 101 may be estimated by performing complementary filtering with multiple signals containing values for the airspeed, e.g., signals with high-frequency noise and signals with low-frequency noise. Estimating the airspeed of the rotorcraft 101 by complementary filtering with multiple signals may improve the accuracy of airspeed values used by the flight control system 201.

Although estimating the various speeds of the rotorcraft 101 by combining multiple different signals may generally result in more accurate speed values, the estimated speed values may be inaccurate in some conditions. When the inputs to the complementary filter diverge by a large amount, the estimated airspeed of the rotorcraft 101 may be inaccurate. In some embodiments, estimation of the airspeed by complementary filtering may only be performed under conditions where the estimated airspeed is likely to be accurate. For example, the inputs to the complementary filter for estimating the airspeed may diverge by a large amount when the rotorcraft 101 is operating in hover, in high winds. In such conditions, the pilot of the rotorcraft 101 may attempt to counteract high winds by quickly changing the heading of the rotorcraft 101, e.g., by actuating the pedals 239. Executing such a quick maneuver may cause pitot-type sensors to falsely indicate a rapid change in longitudinal airspeed without a corresponding change in longitudinal acceleration. During such a maneuver, the longitudinal airspeed of the rotorcraft 101 estimated by the complementary filter may be inaccurate. A similar phenomena may also occur for lateral airspeed. When the estimated airspeed of the rotorcraft 101 is inaccurate, directly measuring the airspeed of the rotorcraft 101 with, e.g., a pitot tube, an airspeed indicator (ASI), or the like may provide more accurate airspeed values. Many conditions that would result in inaccurate airspeed estimation occur at low groundspeeds or low raw airspeeds. In some embodiments, airspeed estimation by complementary filtering may only be performed when the groundspeed of the rotorcraft 101 is greater than a predefined threshold. Likewise, in some embodiments, airspeed estimation by complementary filtering may only be performed when the raw airspeed of the rotorcraft 101 is greater than a predefined threshold.

Figure 8:
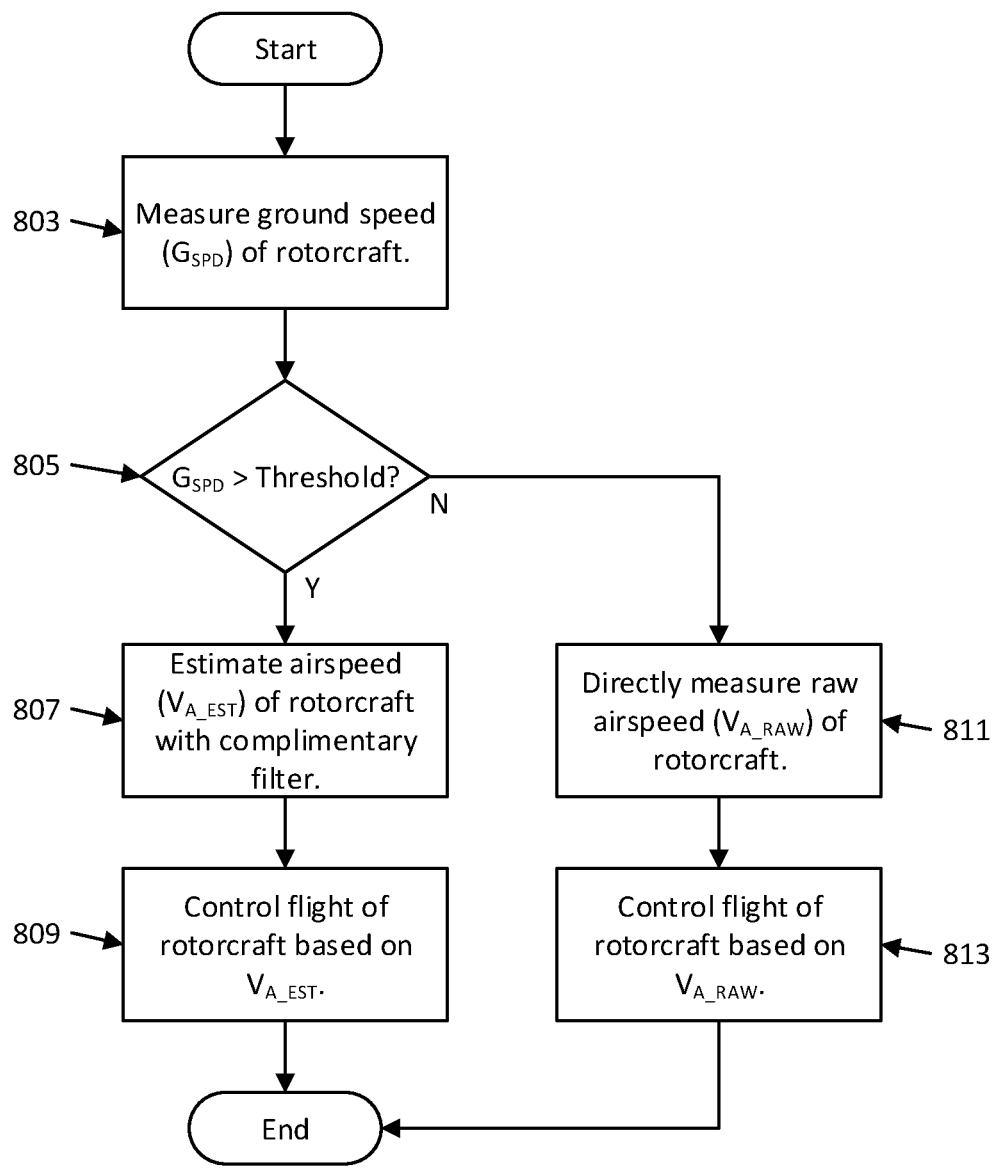
FIG. 8 is a block diagram of a method for airspeed estimation, according to some embodiments.

FIG. 8 is a block diagram of a method 801 for controlling a rotorcraft, according to some embodiments. The method 801 may be implemented as part of the flight control system 201. In particular, the FCCs 205 may perform the method 801 when controlling flight of the rotorcraft 101.

In process 803, the groundspeed of the rotorcraft 101 is measured. The groundspeed may be measured by a GPS, a VHF Omnidirectional Range sensor, or the like. In process 805, the groundspeed of the rotorcraft 101 is compared to a predetermined threshold. In some embodiments, the predetermined threshold is in the range from 25 knots to 40 knots. It should be appreciated that the predetermined threshold may be varied to optimize response in a given rotorcraft application.

When the groundspeed of the rotorcraft 101 is greater than the predetermined threshold, in process 807, the airspeed of the rotorcraft is estimated by combining multiple different signals with a complimentary filter. In some embodiments, the complimentary filter combines a raw airspeed signal from, e.g., an ASI, and a derived airspeed signal from, e.g., an accelerometer. As noted above, one of the signals may have high-frequency noise, and another of the signals may have low-frequency noise. In process 809, flight of the rotorcraft 101 is controlled based on the estimated airspeed ($V_{A\_EST}$) of the rotorcraft 101. One or more loops of the flight control system 201, such as the outer loop 313, middle loop 315, and/or inner loop 317 rely on a determined airspeed value for the rotorcraft 101. The flight control devices of the rotorcraft 101 may be adjusted based on the determined airspeed value to change the flight characteristics of the rotorcraft 101. The $V_{A\_EST}$ value is used by the control loops for the determined airspeed.

When the groundspeed of the rotorcraft 101 is less than the predetermined threshold, in process 811, the airspeed of the rotorcraft is directly measured by receiving a raw airspeed value from, e.g., a pitot tube, an ASI, or the like. Complimentary filtering with multiple signals is not performed when directly measuring the airspeed of the rotorcraft 101. In process 813, flight of the rotorcraft 101 is controlled based on the raw airspeed value ($V_{A\_RAW}$) of the rotorcraft. One or more loops of the flight control system 201, such as the outer loop 313, middle loop 315, and/or inner loop 317 rely on a determined airspeed value for the rotorcraft 101. The flight control devices of the rotorcraft 101 may be adjusted based on the determined airspeed value to change the flight characteristics of the rotorcraft 101. The $V_{A\_RAW}$ value is used by the control loops for the determined airspeed.

In some embodiments, the predetermined threshold for the groundspeed includes hysteresis. For example, the predetermined threshold may be 40 knots (or more generally, a first threshold) when the rotorcraft 101 is accelerating, such that the raw airspeed value ($V_{A\_RAW}$) is used for control until the groundspeed exceed 40 knots, at which time the estimated airspeed ($V_{A\_EST}$) is used for control. Likewise, the predetermined threshold may be 25 knots (or more generally, a lesser second threshold) when the rotorcraft 101 is decelerating, such that the estimated airspeed ($V_{A\_EST}$) is for control used until the groundspeed is less than 25 knots, at which time the current raw airspeed value ($V_{A\_RAW}$) is once again used for control. It should be appreciated that the thresholds may be varied to optimize response in a given rotorcraft application.

The method 801 describes a method for performing airspeed estimation by complementary filtering when the groundspeed of the rotorcraft 101 is greater than a predefined threshold. A method similar to the method 801 may also be used for performing airspeed estimation by complementary filtering when the raw airspeed of the rotorcraft 101 is greater than a predefined threshold. In such embodiments, the raw airspeed may be used instead of the groundspeed for the processes 803 through 813. The raw airspeed may be measured by a pitot-static system or other measurement sensor.

Figure 9:
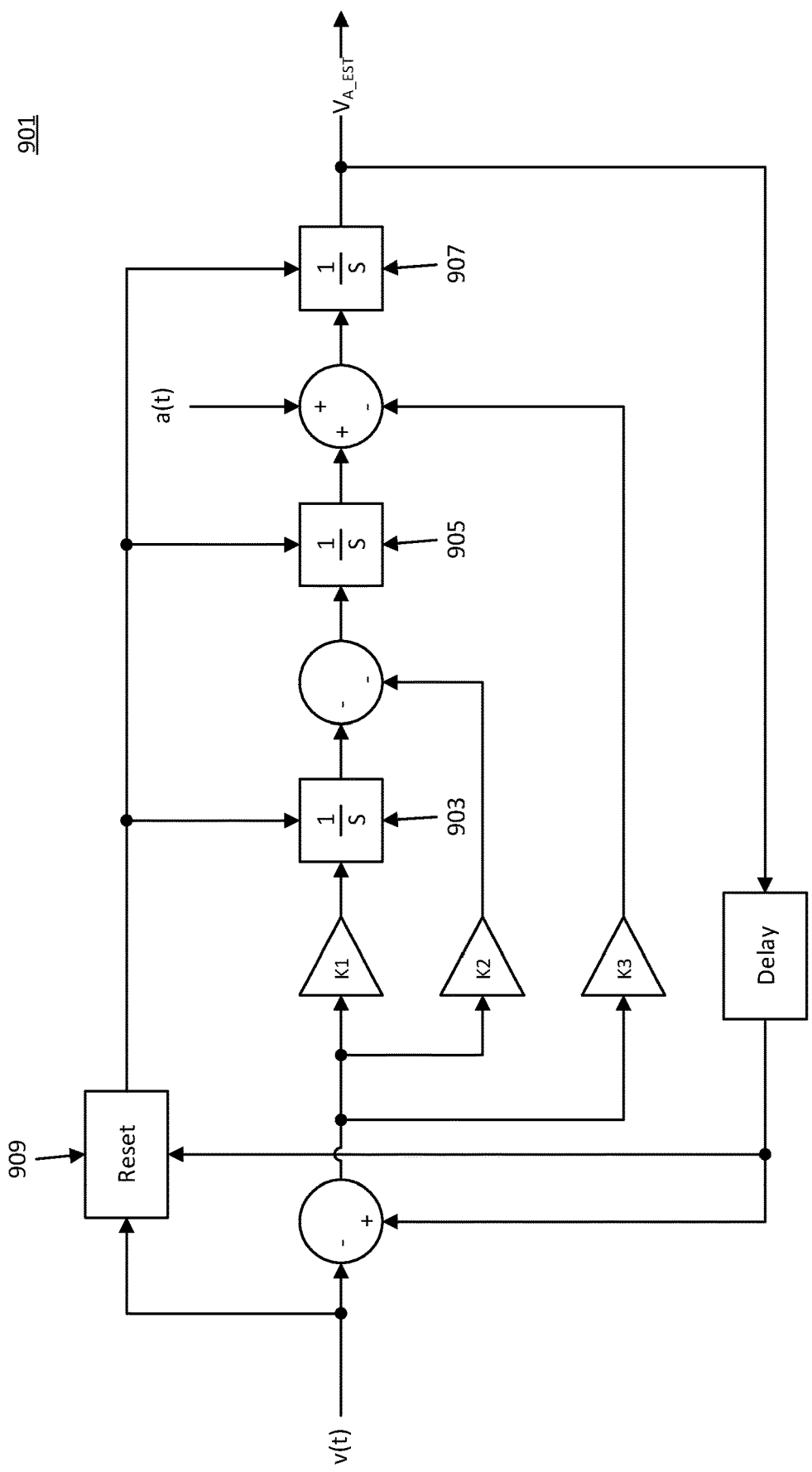
FIG. 9 is a block diagram of a filter, according to some embodiments.

FIG. 9 is a block diagram of a filter 901 that may be used to realize the first system 401 or second system 501, according to some embodiments. The filter 901 is a complimentary filter used to estimate the airspeed of the rotorcraft 101, and produces an estimated airspeed ($V_{A\_EST}$) signal. The filter 901 is implemented with three integrators 903, 905, and 907. Further, the filter 901 is indicative of embodiments where one input signal is derived from a transduced sensor signal, and another signal contains raw airspeed values directly transduced from another sensor. For example, a first input signal may be derived from a signal from an accelerometer (e.g., a(t)), and a second input signal may be a raw airspeed value directly measured by air data systems of the rotorcraft 101 (e.g., v(t)), such as with a variometer or other ASI. The first input signal includes raw values for the forward acceleration of the rotorcraft 101, and the second input signal includes raw values for the forward airspeed of the rotorcraft 101. It should be appreciated that the filter 901 may be used to estimate either lateral or longitudinal airspeeds.

Resetting of the integrators 903, 905, and 907 is controlled by a resetter 909. Upon a reset, the integrators 903 and 905 are reset to values of zero. The integrator 907 may be reset to one of several possible values, as determined by the resetter 909. As noted above, estimation of the rotorcraft 101 airspeed by complementary filtering may only be performed when the groundspeed or raw airspeed of the rotorcraft 101 is greater than a predefined threshold. When the groundspeed or raw airspeed of the rotorcraft 101 is less than the predefined threshold, the filter 901 is bypassed. The resetter 909 bypasses the filter 901 by continually resetting the integrator 907 to the current raw airspeed value (e.g., v(t)). When the groundspeed or raw airspeed of the rotorcraft 101 is greater than the predefined threshold, the filter 901 is permitted to operate normally. Under normal operation, the integrator 907 is reset to a delayed value for the estimated airspeed ($V_{A\_EST}$), and the integrators 903, 905, and 907 may be reset under similar conditions as the integrators 703, 705, and 707 (see FIG. 7).

In some embodiments, the resetter 909 includes a mechanism to filter or rate-limit transitions from use of the estimated airspeed value ($V_{A\_EST}$) to use of the raw airspeed value ($V_{A\_RAW}$). Such a mechanism may help avoid a step change in the displayed airspeed and may allow better control of the rotorcraft 101. For example, the resetter 909 may include a Constant Period Transient-Free Switch (CPTFS) limiter. In some embodiments, a rate-limiting transition is performed when the filter 901 transitions from the initialized state (e.g., when the raw airspeed value is used) to the active state (e.g., when the estimated airspeed value is used), and no rate-limiting transition is performed when the filter 901 transitions from the active state to the initialized state.

Although the embodiments of FIGS. 8 and 9 are described in the context of estimating the airspeed of the rotorcraft 101, it should be appreciated that embodiment techniques may be used to estimate speeds along other directions. In particular, the vertical speed could also be estimated using analogous techniques.

Embodiments may achieve advantages. Estimating the vertical speed and/or airspeed of the rotorcraft 101 by combining multiple different signals may result in more accurate values than directly measuring raw speed values. In particular, by combining multiple noisy signals with a complementary filtering system, the vertical speed and/or airspeed may be accurately estimated and flight of the rotorcraft 101 may be better controlled.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
   receiving a first sensor signal from a pitot tube of a rotorcraft, the first sensor signal including raw airspeed values of the rotorcraft;
   receiving a second sensor signal from an accelerometer of the rotorcraft;
   measuring a first speed of the rotorcraft, the first speed being groundspeed of the rotorcraft or raw airspeed of the rotorcraft;
   determining airspeed values of the rotorcraft, the determining comprising:
      using the raw airspeed values in the first sensor signal as the determined airspeed values in response to the first speed of the rotorcraft being less than or equal to a predetermined value; and
      estimating the determined airspeed values in response to the first speed of the rotorcraft being greater than the predetermined value, the estimating comprising:
         combining the first sensor signal and the second sensor signal with a complementary filter to determine estimated airspeed values; and
         using the estimated airspeed values as the determined airspeed values; and
   adjusting flight control devices of the rotorcraft according to the determined airspeed values.

2. The method of claim 1, wherein combining the first sensor signal and the second sensor signal comprises:
   integrating the second sensor signal with respect to time to obtain a first filtered signal; and
   adding the first filtered signal and the first sensor signal to obtain a second filtered signal, the second filtered signal including the estimated airspeed values of the rotorcraft.

3. The method of claim 1, wherein the predetermined value is a first threshold when the rotorcraft is accelerating, and the predetermined value is a second threshold when the rotorcraft is decelerating, the second threshold being less than the first threshold.

4. The method of claim 3, wherein the first threshold is 40 knots, and the second threshold is 25 knots.

5. A rotorcraft comprising:
   a pitot tube;
   an accelerometer;
   a plurality of flight control devices; and
   a flight control computer coupled to the pitot tube, the accelerometer, and the flight control devices, the flight control computer being configured to:
      receive raw airspeed values of the rotorcraft from the pitot tube;
      receive raw forward acceleration values of the rotorcraft from the accelerometer;
      measure a first speed of the rotorcraft, the first speed being groundspeed of the rotorcraft or raw airspeed of the rotorcraft;
      determine airspeed values of the rotorcraft by:
         using the raw airspeed values as the determined airspeed values in response to the first speed of the rotorcraft being less than or equal to a predetermined value; and
         estimating the determined airspeed values by combining the raw airspeed values and the raw forward acceleration values in response to the first speed of the rotorcraft being greater than the predetermined value; and
      adjusting flight control devices of the rotorcraft according to the determined airspeed values.

6. The rotorcraft of claim 5, wherein the flight control computer is configured to estimate the determined airspeed values by:
- combining the raw airspeed values and the raw forward acceleration values with a complementary filter to determine estimated airspeed values; and
- using the estimated airspeed values as the determined airspeed values.

7. The rotorcraft of claim 6, wherein the flight control computer is configured to combine the raw airspeed values and the raw forward acceleration values by:
- integrating the raw forward acceleration values with respect to time to obtain integrated forward acceleration values; and
- adding the integrated forward acceleration values and the raw airspeed values to obtain the estimated airspeed values.

8. The rotorcraft of claim 5, wherein the predetermined value is a first threshold when the first speed of the rotorcraft is less than or equal to the predetermined value, and the predetermined value is a second threshold when the first speed of the rotorcraft is greater than the predetermined value, the second threshold being less than the first threshold.

9. A method comprising:
- receiving a first sensor signal from an accelerometer of a rotorcraft;
- receiving a second sensor signal from a pitot tube of the rotorcraft;
- combining the first sensor signal and the second sensor signal with a complementary filter to determine an estimated speed of the rotorcraft;
- adjusting flight control devices of the rotorcraft according to the estimated speed of the rotorcraft;
- measuring a groundspeed of the rotorcraft; and
- resetting the complementary filter in response to the groundspeed of the rotorcraft being less than a predetermined threshold.

10. The method of claim 9, wherein the estimated speed of the rotorcraft is an estimate of vertical speed of the rotorcraft.

11. The method of claim 9, wherein the estimated speed of the rotorcraft is an estimate of airspeed of the rotorcraft.

12. The method of claim 9, wherein the combining the first sensor signal and the second sensor signal with the complementary filter comprises:
- filtering the first sensor signal with a first filter to obtain a first filtered signal;
- filtering the second sensor signal with a second filter to obtain a second filtered signal, the second filter and the first filter complementing one another; and
- adding the first filtered signal and the second filtered signal to determine the estimated speed of the rotorcraft.

13. The method of claim 9, wherein the combining the first sensor signal and the second sensor signal with the complementary filter comprises:
- subtracting the first sensor signal from the second sensor signal to obtain a noise difference signal;
- filtering the noise difference signal to obtain a filtered difference signal; and
- adding the first sensor signal and the filtered difference signal to determine the estimated speed of the rotorcraft.

14. The method of claim 9, wherein the receiving the first sensor signal comprises:
- receiving an acceleration signal from the accelerometer; and
- integrating the acceleration signal to obtain the first sensor signal.

15. The method of claim 9, wherein the receiving the second sensor signal comprises:
- receiving a velocity signal from the pitot tube; and
- using the velocity signal as the second sensor signal.

16. The method of claim 9, wherein the adjusting the flight control devices of the rotorcraft comprises:
- decoupling pilot flight controls of the rotorcraft from the flight control devices according to the estimated speed.

* * * * *